United States Patent

Nishioka

[11] Patent Number: 4,522,471
[45] Date of Patent: Jun. 11, 1985

[54] ADAPTER LENS SYSTEM FOR USE WITH PHOTOGRAPHIC CAMERAS

[75] Inventor: Kimihiko Nishioka, Tokyo, Japan

[73] Assignee: Olympus Optical Co., Ltd., Tokyo, Japan

[21] Appl. No.: 523,053

[22] Filed: Aug. 15, 1983

[30] Foreign Application Priority Data

Aug. 20, 1982 [JP] Japan .................... 57-143343

[51] Int. Cl.³ .................................. G02B 9/16
[52] U.S. Cl. ......................... 350/449; 350/475
[58] Field of Search ........................ 350/449, 475

[56] References Cited

U.S. PATENT DOCUMENTS

| | | | |
|---|---|---|---|
| 2,388,869 | 11/1945 | Reiss | 350/475 X |
| 2,720,814 | 10/1955 | Sandback | 350/475 |
| 3,443,863 | 5/1969 | Ruben | 350/475 |
| 3,649,103 | 3/1972 | Kamimura | 350/475 |
| 3,910,685 | 10/1975 | DeJager | 350/475 |
| 3,912,379 | 10/1975 | DeJager | 350/449 X |

FOREIGN PATENT DOCUMENTS 57-2012  1/1982  Japan ........................ 350/475

*Primary Examiner*—John K. Corbin
*Assistant Examiner*—Scott J. Sugarman
*Attorney, Agent, or Firm*—Cushman, Darby & Cushman

[57] ABSTRACT

A triplet type of adapter lens system for use with photographic cameras comprising a first positive lens element, a second biconcave lens element, a third positive lens element and a stop arranged on the front side of said first lens element, said adapter lens system having a short total length, a long back focal length and favorable corrected aberrations.

6 Claims, 11 Drawing Figures

SPHERICAL ABERRATION
NA=0.0069

ASTIGMATISM
IM.H=13.5

DISTORTION
IM.H=13.5

LATERAL CHROMATIC ABERRATION
IM.H=13.5

COMA
IM.H=13.5

SPHERICAL ABERRATION

ASTIGMATISM

DISTORTION

LATERAL CHROMATIC ABERRATION

COMA

ADAPTER LENS SYSTEM FOR USE WITH PHOTOGRAPHIC CAMERAS

BACKGROUND OF THE INVENTION (a) Field of the Invention:

The present invention relates to an adapter lens system for use with photographic cameras which are utilized for photographing images formed by optical instruments for observation directly by man's eyes such as endoscopes, microscopes and telescopes.

(b) Discription of the prior art:

FIG. 1 shows a sectional view illustrating composition of an optical system of a telescope consisting of an objective lens 1 and an eyepiece 2. As is seen from this drawing, the optical system is so designed as to permit man's eye to observe an image formed at a nearly infinite distance by the eyepiece 2.

As a method for photographing an image formed by such a telescope, there has conventionally been known a means to shift the eyepiece 2 away from the objective lens 1 as shown in FIG. 2 (in the direction indicated by an arrow) so that a real image formed by the objective lens 1 is refocused on a film 4 by the eyepiece. However, this method makes correction of aberrations rather difficult since it uses the eyepiece 2 at different imaging magnifications levels for observation by man's eye and photographing an image. Speaking concretely, aberrations are aggravated in the optical system when it is set either for observation by man's eye or photographing with a camera.

As a means for correcting this defect, there has been known another method to employ an adapter lens as shown in FIG. 3. Speaking concretely, this method use a technique to arrange an adapter lens 3 on the rear side of the position of the eyepiece 2 for observation by man's eye so that the image formed at nearly infinite distance by the eyepiece 2 is refocused on the film 4. This method mades it possibly to permit photographing with favorably corrected aberrations so long as aberrations of the eyepiece 2 are corrected favorably for observation by man's eye.

A lens system used for this purpose (adapter lens system) may have a large F number for magnifying an image at a high ratio and a relatively simple composition. For adding an adapter lens system on the rear side of an eyepiece of an ocular observation instrument, however, a stop 5 of the adapter lens system 3 becomes the exit pupil of the eyepiece 2 and is located on the front side of the adapter lens system 3. When an image is photographed by using a body of a commercially availably single-reflex lens type of camera, on the other hand, it is necessary to prolong the back focal length of the adapter lens system 3 to a certain degree as is understood from FIG. 4.

The back focal length must be prolonged also when a half prism (a prism comprising a semi-transparent surface) for automatic exposure control is arranged on the rear side of the adapter lens system 3 as shown in FIG. 5. However, a large total length of the adapter lens system or a camera body will be inconvenient for photographing operations. Therefore, it is desired for the adapter lens system to have a total length as short as possible.

SUMMARY OF THE INVENTION

A general object of the present invention is to provide a photographing adapter lens system having a short total length and favorably corrected aberrations.

The adapter lens system according to the present invention is a triplet type comprising a stop arranged on the front side of its lens elements as shown in FIG. 6. Speaking concretely, the adapter lens system comprises a stop, a first positive lens element, a second lens element and a third positive lens element, said second lens element being designed as a biconcave element for correcting spherical aberration, coma and so on.

Further, the adapter lens system according to the present invention is so designed as to satisfy conditions (1) to (6) specified below:

(1) $f_B > 0.85f$
(2) $L < 0.35f$
(3) $f_1 > 0.5f$
(4) $0.06f \leq d_3$
(5) $\nu_1 < 45$
(6) $d_5 \geq 0.05f$ wherein the reference symbols are defined as follows:

L: total length of said adapter lens system as a whole $f_B$: distance as measured from the image side surface of said third lens element to the rear focal point of the lens system (back focal length)

$f_1$: focal length of said first lens element f: focal length of the adapter lens system as a whole $d_3$: airspace reserved between said first and second lens elements $d_5$: airspace reserved between said second and third lens elements $\nu_1$: Abbe's number of said first lens element Now, significance of the individual conditions will be described in details:

The condition (1) defines a back focal length so as to enable attaching the adapter lens system to a single-reflex lens camera and arranging a light measuring prism on the rear side of said adapter lens system. If the backfocal length of the adapter lens system does not satisfy this condition, it will be impossible to attach the adapter lens system to a single-reflex lens camera or arranged a light measuring prism in said adapter lens system.

The condition (2) specifies a total length of said adapter lens system. If the total length of the adapter lens system exceeds the limit defined by the condition (2), photographing operations will be rather inconvenient.

The condition (3) defines power of the first lens element. In order to obtain a long back focal length, it is necessary to shift the principal point of the lens system rearward. For this purpose, the first lens element must have a low power. If the condition (3) is not satisfied, it will be impossible to prolong the back focal length of the adapter lens system.

The condition (4) defines airspace to be reserved between the first and second lens elements. The condition (2) has been adopted since the adapter lens system of the concerned type must have a short total length. In this respect, it is desirable that $d_3$ be as short as possible. When $d_3$ is too narrow, however, it will be impossible to correct aberrations sufficiently favorably. In case of a triplet type of lens system comprising a stop on the front side of the first lens element, coma due to the upper rays can be positively corrected substantially by the rear surface only of the concave lens element (the image side surface of the second lens element). When $d_3$ is narrow, the upper rays height is low on the rear side surface of the second lens element, thereby weakening the function to positively correcting coma. When the said lens surface is so designed as to have a small radius of curvature to enhance this function, the front side surface of the second lens element will have a large radius of curvature, thereby resulting in undercorrection of spherical aberration.

As is uncerstood from the foregoing description, the condition (4) is necessary for preventing spherical aberration from being undercorrected when coma is corrected favorably. Therefore, spherical aberration will be undercorrected if the condition (4) is not satisfied.

The condition (5) has been adopted for preventing longitudinal chromatic aberration from being overcorrected when lateral chromatic aberration is corrected favorably.

The adapter lens system according to the present invention is so designed as to correct lateral chromatic aberration favorably by utilizing the diverging function of the second lens element so as to cancel the positive functions of the other lens elements. When the dispersing power of the second lens element is so defined as to correct lateral chromatic aberration favorably, correcting function for longitudinal chromatic aberration will be too strong and result in overcorrection of longitudinal chromatic aberration. In order to prevent such overcorrection of longitudinal chromatic aberration, it is necessary to cancel the longitudinal chromatic aberration produced by the second lens element by imparting high dispersing power to the first lens element on which the paraxial rays incident at its higher section. Overcorrection of longitudinal chromatic aberration has been prevented by this concept. Longitudinal chromatic aberration will be overcorrected if the condition (5) is not satisfied.

The condition (6) has been adopted to prevent the airspace reserved between the second and third lens elements from being too short. When the second lens element is located too close to the third lens element by designing the adapter lens system so as to satisfy the conditions (1) and (2), both the second and third lens elements will have too short focal lengths, thereby remarkably curving coma. Though a short airspace $d_5$ between the second and third lens elements is desirable for shortening the total length of the entire lens system, $d_5$ shorter than the limit defined by the condition (6) will aggravate coma for the reason described above.

DETAILED DESCRIPTION OF THE PREFERRED EMBODIMENTS

Figure 1:
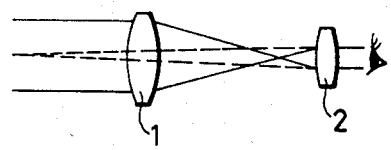
FIG. 1 shows a sectional view illustrating composition of an optical system of a telescope.
Figure 2:
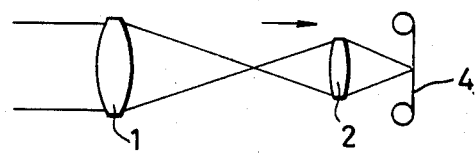
FIG. 2 and FIG. 3 show sectional views illustrating the methods for photographing an image formed by said telescope.
Figure 3:
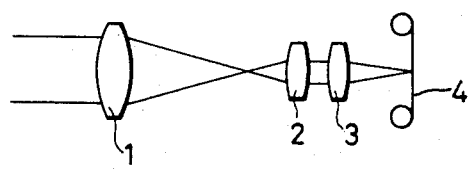
Figure 4:
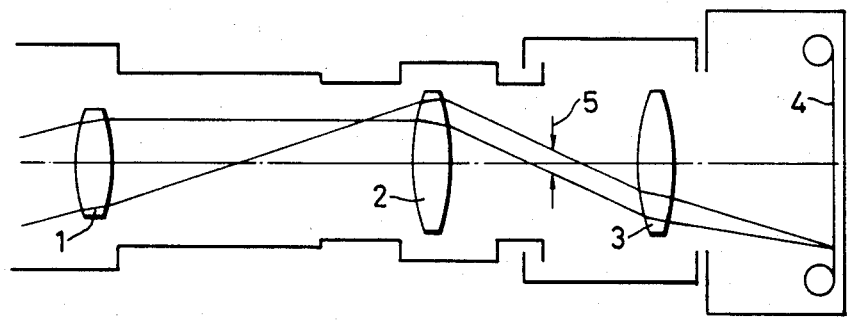
FIG. 4 shows a sectional view illustrating the positional relationship between the lens elements and a stop for the method shown in FIG. 3.
Figure 5:
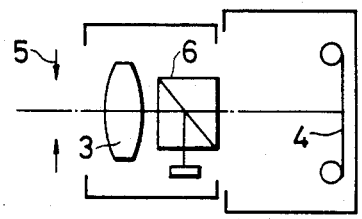
FIG. 5 shows a sectional view in which an adapter lens systemm is attached to a photographing camera.
Figure 6:
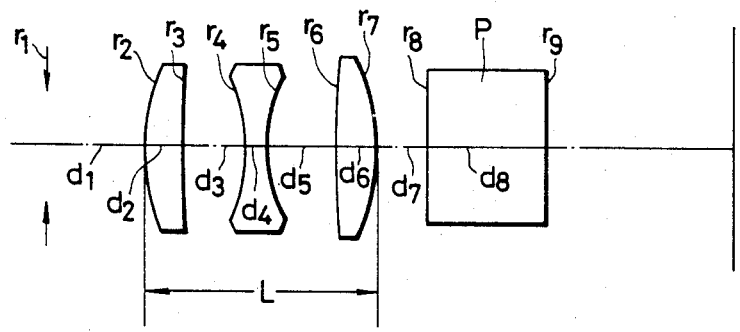
FIG. 6 shows a sectional view illustrating the composition of the adapter lens system according to the present invention.

Now, some preferred embodiments of the adapter lens system according to the present invention will be described below:

Embodiment 1

$r_1 = \infty$
$d_1 = 8.4128$
$r_2 = 40.0974$
$d_2 = 5.0477$  $n_1 = 1.60342$  $\nu_1 = 38.01$
$r_3 = \infty$
$d_3 = 7.2199$
$r_4 = -52.2462$
$d_4 = 2.3556$  $n_2 = 1.68893$  $\nu_2 = 31.08$
$r_5 = 40.1509$
$d_5 = 8.9327$
$r_6 = 111.5114$
$d_6 = 5.0477$  $n_3 = 1.62041$  $\nu_3 = 60.27$
$r_7 = -38.5050$
$d_7 = 2.5239$
$r_8 = \infty$
$d_8 = 23.5559$  $n_4 = 1.51633$  $\nu_4 = 64.15$
$r_9 = \infty$
$f = 100$,
object point 841.284, image height 13.461
$f_B = 94.864$  $L = 28.61$  $f_1 = 66.45$

Embodiment 2

$r_1 = \infty$
$d_1 = 10.0365$
$r_2 = 44.8883$
$d_2 = 3.3680$  $n_1 = 1.60717$  $\nu_1 = 40.26$
$r_3 = \infty$
$d_3 = 10.306$
$r_4 = -38.2298$
$d_4 = 3.7721$  $n_2 = 1.64769$  $\nu_2 = 33.80$
$r_5 = 38.2298$
$d_5 = 6.1292$
$r_6 = 80.4927$
$d_6 = 5.0520$  $n_3 = 1.58913$  $\nu_3 = 60.97$
$r_7 = -31.1672$
$d_7 = 2.5260$
$r_8 = \infty$
$d_8 = 23.5758$  $n_4 = 1.51633$  $\nu_4 = 64.15$
$r_9 = \infty$
$f = 100$,
object point 841.992, image height 13.472
$f_B = 94.891$,  $L = 28.62$,  $f_1 = 73.93$

Embodiment 3

$r_1 = \infty$
$d_1 = 8.4110$
$r_2 = 47.4856$
$d_2 = 3.3644$  $n_1 = 1.64769$  $\nu_1 = 33.80$
$r_3 = \infty$
$d_3 = 9.1478$
$r_4 = -48.9170$
$d_4 = 4.3722$  $n_2 = 1.72825$  $\nu_2 = 28.46$
$r_5 = 48.9170$
$d_5 = 7.5075$
$r_6 = 131.8984$
$d_6 = 4.2055$  $n_3 = 1.69680$  $\nu_3 = 55.52$
$r_7 = -39.7164$
$d_7 = 2.5233$
$r_8 = \infty$
$d_8 = 23.5508$  $n_4 = 1.51633$  $\nu_4 = 64.15$
$r_9 = \infty$
$f = 100$,
object point 841.0995, image height 13.458
$f_B = 94.815$,  $L = 31.12$,  $f_1 = 73.32$

Embodiment 4

$r_1 = \infty$
$d_1 = 8.4189$
$r_2 = 40.2970$
$d_2 = 3.3676$  $n_1 = 1.61293$  $\nu_1 = 37.00$
$r_3 = \infty$
$d_3 = 8.3588$
$r_4 = -49.8022$ -continued

| | | |
|---|---|---|
| $d_4 = 3.4457$ | $n_2 = 1.68893$ | $\nu_2 = 31.08$ |
| $r_5 = 37.8875$ | | |
| $d_5 = 8.4009$ | | |
| $r_6 = 92.2409$ | | |
| $d_6 = 5.0514$ | $n_3 = 1.58913$ | $\nu_3 = 60.97$ |
| $r_7 = -35.7511$ | | |
| $d_7 = 2.5257$ | | |
| $r_8 = \infty$ | | |
| $d_8 = 23.5730$ | $n_4 = 1.51633$ | $\nu_4 = 64.15$ |
| $r_9 = \infty$ | | |
| $f = 100$, | | |
| object point 841.89, image height 13.470 | | |
| $f_B = 94.914$, $L = 28.62$, $f_1 = 65.75$ | | |
| Embodiment 5 | | |
| $r_1 = \infty$ | | |
| $d_1 = 8.4222$ | | |
| $r_2 = 35.9119$ | | |
| $d_2 = 5.0533$ | $n_1 = 1.58144$ | $\nu_1 = 40.75$ |
| $r_3 = 189.9936$ | | |
| $d_3 = 6.7377$ | | |
| $r_4 = -60.6219$ | | |
| $d_4 = 3.3689$ | $n_2 = 1.66680$ | $\nu_2 = 33.04$ |
| $r_5 = 34.5753$ | | |
| $d_5 = 7.58$ | | |
| $r_6 = 71.9651$ | | |
| $d_6 = 6.7377$ | $n_3 = 1.62041$ | $\nu_3 = 60.27$ |
| $r_7 = -41.5271$ | | |
| $d_7 = 2.5267$ | | |
| $r_8 = \infty$ | | |
| $d_8 = 23.5821$ | $n_4 = 1.51633$ | $\nu_4 = 64.15$ |
| $r_9 = \infty$ | | |
| $f = 100$, | | |
| object point 842.219, image height 13.476 | | |
| $f_B = 96.455$, $L = 29.48$, $f_1 = 75.25$ | | | wherein the reference symbols $r_1$ through $r_9$ represent radii of curvature on the surfaces of the respective lens elements, the reference symbols $d_1$ through $d_8$ designate thicknesses of the respective lens elements and airspaces reserved between the respective lens elements, the reference symbols $n_1$ through $n_4$ denote refractive indices of the respective lens elements, and the reference symbols $\nu_1$ through $\nu_4$ represent Abbe's numbers of the respective lens elements.

The numerical data of the embodiments described above contain those of stops and light measuring prisms. That is to say, the reference symbol $r_1$ represents radius of curvature of a stop, the reference symbol $d_1$ designates a distance between a stop and the object side surface of the first lens element, the reference symbols $r_8$ and $r_9$ denote radii of curvature on both the surfaces of prism P, the reference symbol $d_8$ represents thickness thereof, the reference symbol $n_4$ designates refractive index of prism P and the reference symbol $\nu_4$ denotes Abbe's number thereof.

Figure 7:
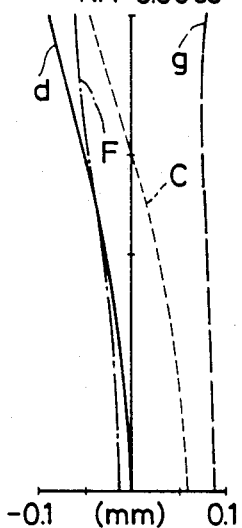
FIG. 7 through FIG. 11 respectively show curves illustrating the aberration characteristics of Embodiments 1 through 5 of the adapter lens system according to the present invention.
Figure 7:
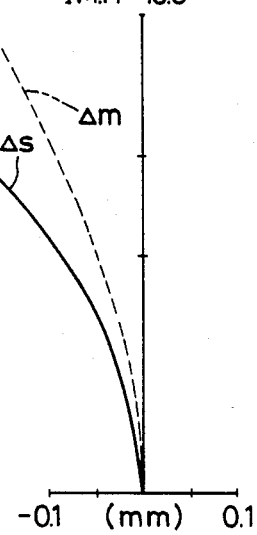
Figure 7:
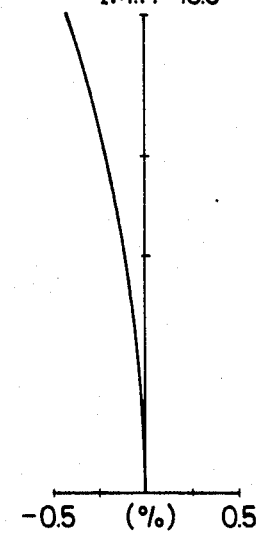
Figure 7:
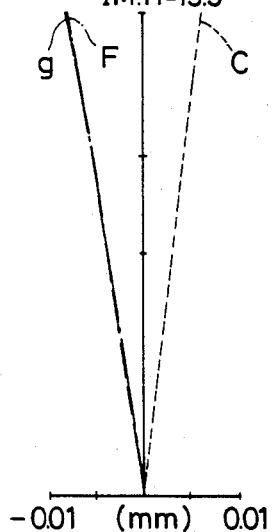
Figure 7:
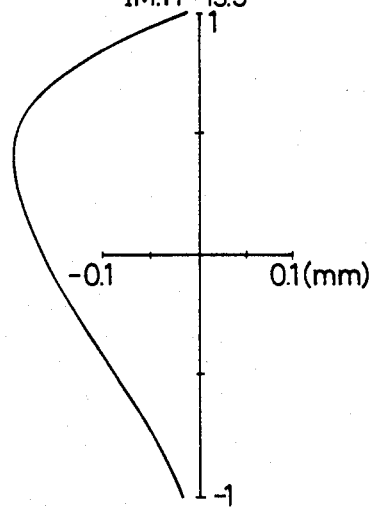
Figure 8:
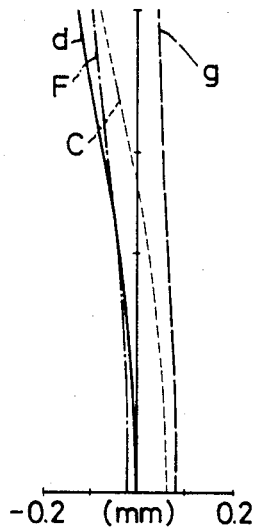
Figure 8:
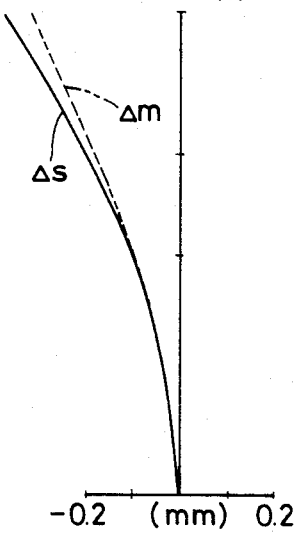
Figure 8:
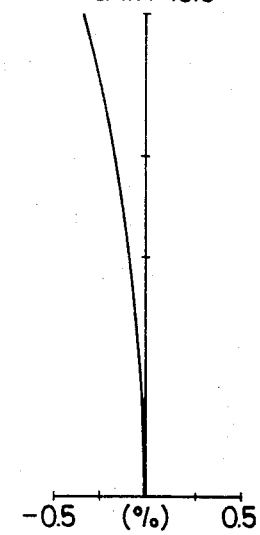
Figure 8:
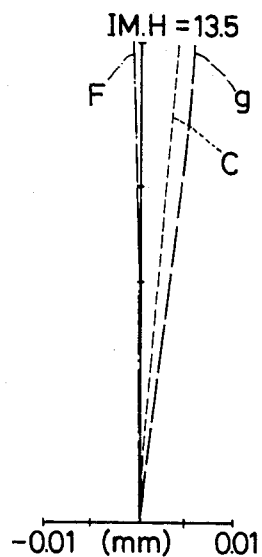
Figure 8:
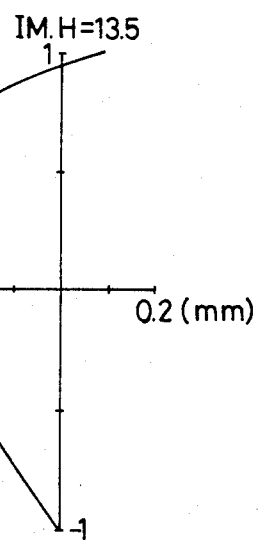
Figure 9:
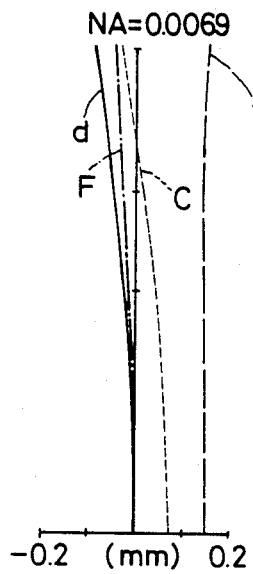
Figure 9:
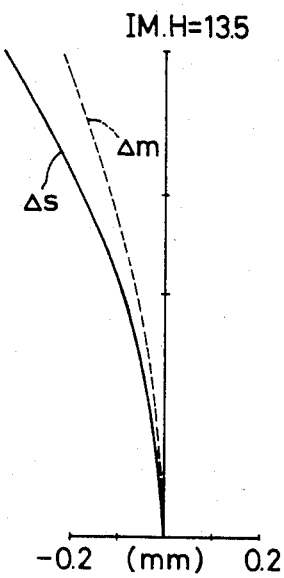
Figure 9:
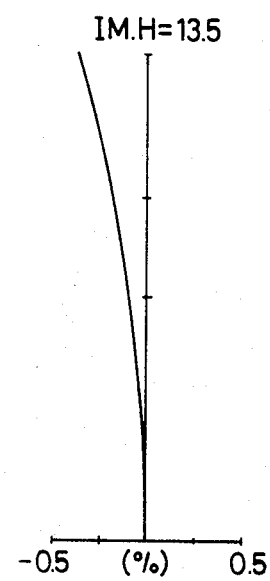
Figure 9:
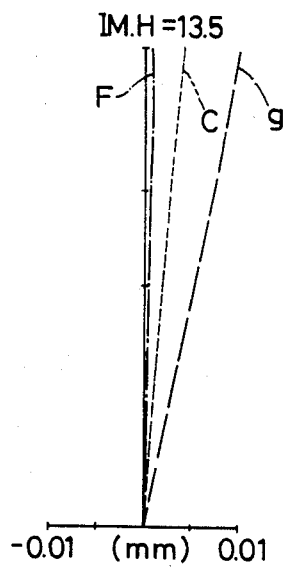
Figure 9:
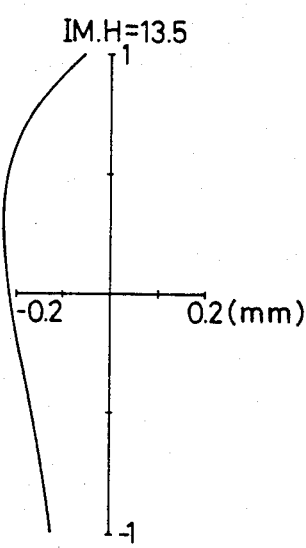
Figure 10:
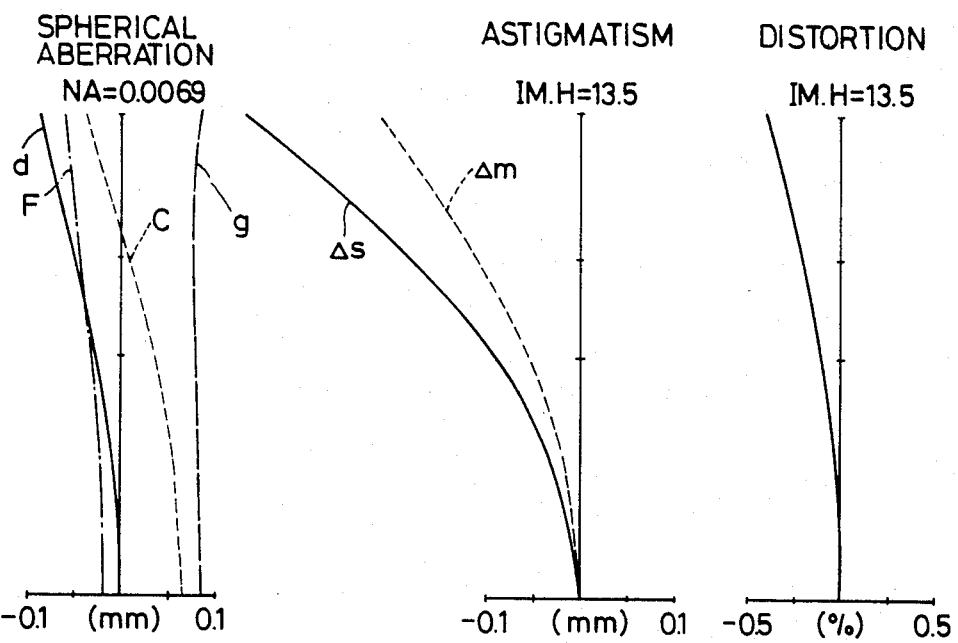
Figure 10:
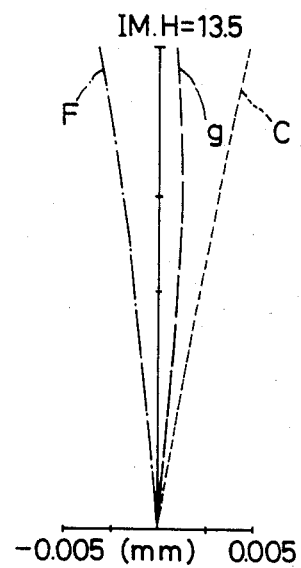
Figure 10:
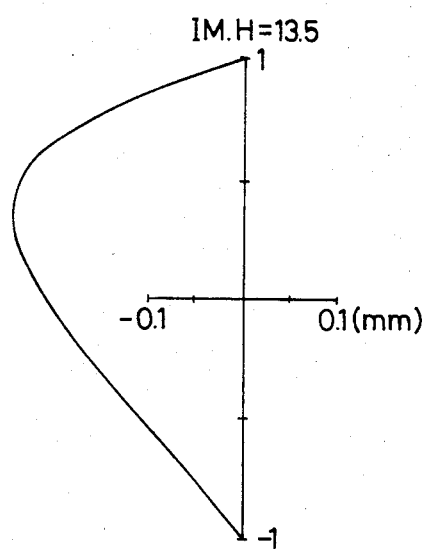
Figure 11:
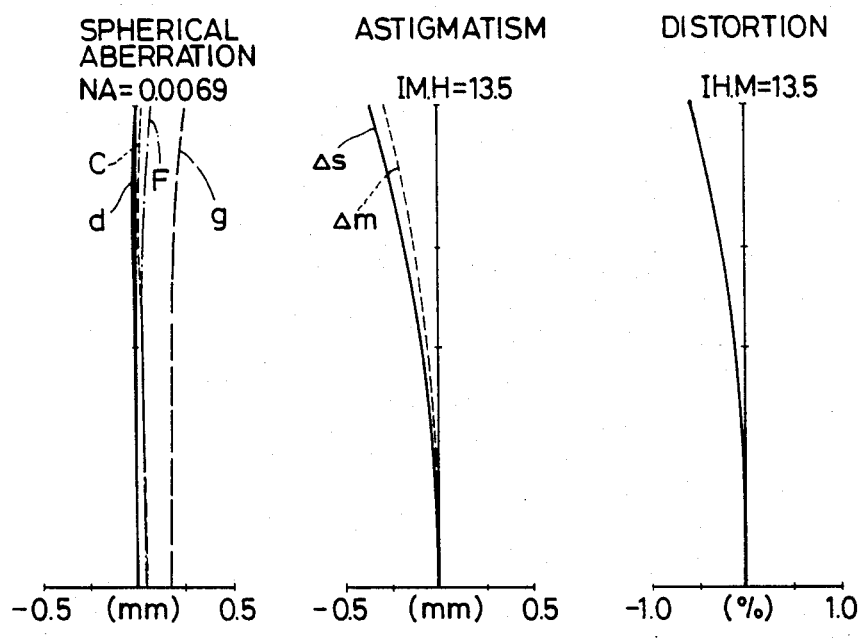
Figure 11:
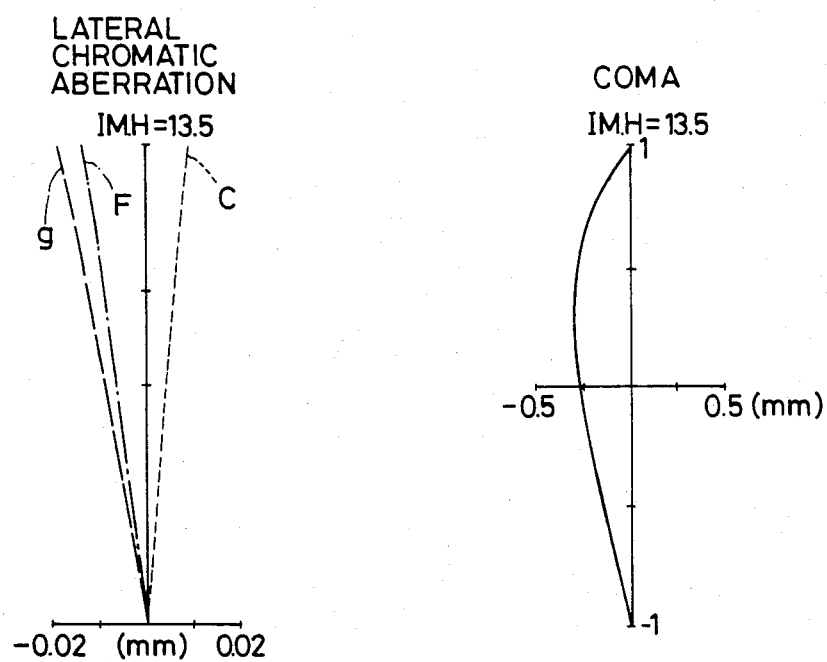

Aberrations of these embodiments are illustrated in FIG. 7 through FIG. 11 as those including aberrations produced by the prsim P.

As is clearly understood from the foregoing descriptions and embodiments, the adapter lens system according to the present invention is a triplet type comprising a stop arranged on the front side of the lens elements and the second lens element designed as a biconcave element. The lens system is short in its total length, favorably corrected in aberrations and desirable as an adapter lens system for use with photographic cameras since it is so designed as to safisfy the conditions (1) through (6) described above.

Each embodiment is usable as a photographic camera lens since it has about +1.19 diopters and an object point located nearly at an infinite distance.

I claim:

1. An adapter lens system for use with photographic cameras comprising a first positive lens element, a second biconcave lens element, and a third positive lens element and a stop arranged on the front side of said lens elements, said lens system satisfying the following condition:

(1) $f_B > 0.85f$
(2) $L < 0.35f$
(3) $f_1 > 0.5f$
(4) $0.06f \leq d_3$
(5) $\nu_1 < 45$
(6) $d_5 \geq 0.05f$ wherein the reference symbol L represents total length of said lens system as a whole, the reference symbol $f_B$ designates back focal length of said lens system, the reference symbol $f_1$ denotes focal length of said first lens element, the reference symbol f represents focal length of said lens system as a whole, the reference symbol $d_3$ designates airspace reserved between said first and second lens elements, the reference symbol $d_5$ denotes airspace reserved between said second and third lens elements and the reference symbol $\nu_1$ represents Abbe's number of said first lens element.

2. An adapter lens system for use with photographic cameras according to claim 1 having the following numerical data:

| | | |
|---|---|---|
| $r_1 = \infty$ | | |
| $d_1 = 8.4128$ | | |
| $r_2 = 40.0974$ | | |
| $d_2 = 5.0477$ | $n_1 = 1.60342$ | $\nu_1 = 38.01$ |
| $r_3 = \infty$ | | |
| $d_3 = 7.2199$ | | |
| $r_4 = -52.2462$ | | |
| $d_4 = 2.3556$ | $n_2 = 1.68893$ | $\nu_2 = 31.08$ |
| $r_5 = 40.1509$ | | |
| $d_5 = 8.9327$ | | |
| $r_6 = 111.5114$ | | |
| $d_6 = 5.0477$ | $n_3 = 1.62041$ | $\nu_3 = 60.27$ |
| $r_7 = -38.5050$ | | |
| $f = 100$, | | |
| object point 841.284, image height 13.461 | | |
| $f_B = 94.864$, $L = 28.61$, $f_1 = 66.45$ | | | wherein the reference symbols $r_1$ through $r_7$ represent radii of curvature on the surfaces of the respective lens elements, the reference symbols $d_1$ through $d_3$ designate the thicknesses of the respective lens elements and airspaces reserved between the respective lens elements, the reference symbols $n_1$ through $n_3$ denote refractive indices of the respective lens elements and the reference symbols $\nu_1$ through $\nu_3$ represent Abbe's numbers of the respective lens elements.

3. An adapter lens system for use with photographic cameras according to claim 1 having the following numerical data:

| | | |
|---|---|---|
| $r_1 = \infty$ | | |
| $d_1 = 10.0365$ | | |
| $r_2 = 44.8883$ | | |
| $d_2 = 3.3680$ | $n_1 = 1.60717$ | $\nu_1 = 40.26$ |
| $r_3 = \infty$ | | |
| $d_3 = 10.306$ | | |
| $r_4 = -38.2298$ | | |
| $d_4 = 3.7721$ | $n_2 = 1.64769$ | $\nu_2 = 33.80$ |
| $r_5 = 38.2298$ | | |
| $d_5 = 6.1292$ | | |
| $r_6 = 80.4927$ | | |
| $d_6 = 5.0520$ | $n_3 = 1.58913$ | $\nu_3 = 60.97$ |
| $r_7 = -31.1672$ | | |

-continued

```
f = 100
object point 841.992, image height 13.472
f_B = 94.891,    L = 28.62,    f_1 = 73.93
``` wherein the reference symbols $r_1$ through $r_7$ represent radii of curvature on the surfaces of the respective lens elements, the reference symbols $d_1$ through $d_6$ designate the thicknesses of the respective lens elements and airspaces reserved between the respective lens elements, the reference symbols $n_1$ through $n_3$ denote refractive indices of the respective lens elements and the reference symbols $v_1$ through $v_3$ represent Abbe's numbers of the respective lens elements.

4. An adapter lens system for use with photographic cameras according to claim 1 having the following numerical data:

```
r_1 = ∞
d_1 = 8.4110
r_2 = 47.4856
d_2 = 3.3644        n_1 = 1.64769      v_1 = 33.80
r_3 = ∞
d_3 = 9.1478
r_4 = -48.9170
d_4 = 4.3722        n_2 = 1.72825      v_2 = 28.46
r_5 = 48.9170
d_5 = 7.5075
r_6 = 131.8984
d_6 = 4.2055        n_3 = 1.69680      v_3 = 55.52
r_7 = -39.7164
    f = 100,
    object point 841.0995, image height 13.458
    f_B = 94.815,    L = 31:12,    f_1 = 73.32
``` wherein the reference symbols $r_1$ through $r_7$ represent radii of curvature on the surfaces of the respective lens elements, the reference symbols $d_1$ through $d_6$ designate the thicknesses of the respective lens elements and airspaces reserved between the respective lens elements, the reference symbols $n_1$ through $n_3$ denote refractive indices of the respective lens elements and the reference symbols $v_1$ through $v_3$ represent Abbe's numbers of the respective lens elements.

5. An adapter lens system for use with photographic cameras according to claim 1 having the following numerical data:

```
r_1 = ∞
d_1 = 8.4189
r_2 = 40.2970
d_2 = 3.3676        n_1 = 1.61293      v_1 = 37.00
r_3 = ∞
d_3 = 8.3588
r_4 = -49.8022
d_4 = 3.4457        n_2 = 1.68893      v_2 = 31.08
r_5 = 37.8875
d_5 = 8.4009
r_6 = 92.2409
d_6 = 5.0514        n_3 = 1.58913      v_3 = 60.97
r_7 = -35.7511
    f = 100,
    object point 841.89, image height 13.470
    f_B = 94.914,    L = 28.62,    f_1 = 65.75
``` wherein the reference symbols $r_1$ through $r_7$ represent radii of curvature on the surfaces of the respective lens elements, the reference symbols $d_1$ through $d_6$ designate the thicknesses of the respective lens elements and airspaces reserved between the respective lens elements, the reference symbols $n_1$ through $n_3$ denote refractive indices of the respective lens elements and the reference symbols $v_1$ through $v_3$ represent Abbe's numbers of the respective lens elements.

6. An adapter lens system for use with photograhic cameras according to claim 1 having the following numerical data:

```
r_1 = ∞
d_1 = 8.4222
r_2 = 35.9119
d_2 = 5.0533        n_1 = 1.58144      v_1 = 40.75
r_3 = 189.9936
d_3 = 6.7377
r_4 = -60.6219
d_4 = 3.3689        n_2 = 1.66680      v_2 = 33.04
r_5 = 34.5753
d_5 = 7.58
r_6 = 71.9651
d_6 = 6.7377        n_3 = 1.62041      v_3 = 60.27
r_7 = -41.5271
    f = 100,
    object point 842.219, image height 13.476
    f_B = 96.455,    L = 29.48,    f_1 = 75.25
``` wherein the reference symbols $r_1$ through $t_7$ represent radii of curvature on the surfaces of the respective lens elements, the reference symbols $d_1$ through $d_6$ designate the thicknesses of the respective lens elements and airspaces reserved between the respective lens elements, the reference symbols $n_1$ through $n_3$ denote refractive indices of the respective lens elements and the reference symbols $v_1$ through $v_3$ represent Abbe's numbers of the posiective lens elements.

* * * * *